United States Patent [19]

Kurokami

[11] Patent Number: 5,285,475
[45] Date of Patent: Feb. 8, 1994

[54] DECISION-FEEDBACK EQUALIZER CAPABLE OF PRODUCING AN EQUALIZED SIGNAL AT HIGH SPEED

[75] Inventor: Yuzo Kurokami, Tokyo, Japan

[73] Assignee: NEC Corporation, Japan

[21] Appl. No.: 838,058

[22] Filed: Feb. 19, 1992

[30] Foreign Application Priority Data

Feb. 19, 1991 [JP] Japan ................................. 3-045439

[51] Int. Cl.⁵ ............................................ H03H 7/30
[52] U.S. Cl. ................................ 375/14; 364/724.16;
 364/724.19
[58] Field of Search ............................. 375/11–12,
 375/14, 17, 76; 333/18, 28 R; 364/724.16,
 724.19, 724.2

[56] References Cited

U.S. PATENT DOCUMENTS 4,672,631  6/1987  Suzuki et al. ..................... 375/14

FOREIGN PATENT DOCUMENTS 0170225  2/1986  European Pat. Off. ............. 375/14
0309250  3/1989  European Pat. Off. ............. 375/14
0461931 12/1991  European Pat. Off. ............. 375/14
2069296  8/1981  United Kingdom ................. 375/14

OTHER PUBLICATIONS

Proakis, "Decision-Feedback Equalization", Digital Communications, pp. 382–385, 1983.

Primary Examiner—Curtis Kuntz
Assistant Examiner—Young Tse
Attorney, Agent, or Firm—Ostrolenk, Faber, Gerb & Soffen

[57] ABSTRACT

In a decision-feedback equalizer for use in combination with a demodulator (13) to equalize a demodulated signal into an equalized signal through first and second transversal filters (15, 16), the demodulated signal and an input signal are filtered by the first and the second transversal filters into the first and the second filtered signals in accordance with a plurality of main controllable tap gains and a plurality of subsidiary controllable tap gains, respectively. The input signal supplied to the second transversal filter is controlled or selected by a supplying circuit (42). Specifically, the supplying circuit (42) produces as the input signal a first local signal obtained from the demodulated signal when the demodulator is put in a synchronization state. The supplying circuit produces as the input signal a second local signal obtained from the equalized signal when the demodulator is put out of the synchronization state.

5 Claims, 3 Drawing Sheets

DECISION-FEEDBACK EQUALIZER CAPABLE OF PRODUCING AN EQUALIZED SIGNAL AT HIGH SPEED

BACKGROUND OF THE INVENTION

This invention relates to a decision-feedback equalizer for use in equalizing a demodulated signal sent from a demodulator.

In general, a demodulator is operable in response to a received signal sent through a radio channel to demodulate the received signal into a demodulated signal. The received signal may have been seriously subjected to distortion during transmission. The demodulated signal may be a baseband signal having a binary level or multilevel. A decision-feedback equalizer of the type described is supplied with the demodulated signal and is operated to equalize the demodulated signal into an equalized signal. As a result, the distortion is removed from the equalized signal which is put into a distortion-free state.

A conventional decision-feedback equalizer comprises first and second transversal filters each of which has a plurality of controllable taps and which are supplied with the demodulated signal and an input signal which is produced on the basis of the equalized signal in a manner to be described later. The first transversal filter filters the demodulated signal into a first filtered signal in accordance with a plurality of main controllable tap gains of the respective taps. On the other hand, the second transversal filter filters the input signal into a second filtered signal in accordance with a plurality of subsidiary controllable tap gains. The conventional decision-feedback equalizer further comprises a producing section for producing the equalized signal dependent upon the first and the second filtered signals and a control section for controlling the main and the subsidiary controllable tap gains in accordance with the demodulated and the equalized signals.

Such a conventional decision-feedback equalizer is disclosed in "DIGITAL COMMUNICATIONS" which is issued by McGRAW-HILL INTERNATIONAL BOOK COMPANY and which is written by John G. Proakis, Professor of Electrical Engineering in Northeastern University.

However, the distortion inevitably and partially remains as a residual distortion in the equalized signal in the above-referred decision-feedback equalizer when the received signal is subjected to a large distortion through the radio channel. As a result, the main and the subsidiary controllable tap gains are not quickly controlled by the control section because the residual distortion remains in the equalized signal. Therefore, it is difficult for the conventional decision-feedback equalizer of the above-mentioned type to quickly equalize the demodulated signal into the equalized signal and to obtain a distortion-free equalized signal.

SUMMARY OF THE INVENTION

It is an object of this invention to provide a decision-feedback equalizer capable of producing an equalized signal which has substantially no residual distortion.

Other objects of this invention will become clear as the description proceeds.

On describing the gist of this invention, it should at first be understood that a decision-feedback equalizer is connected to a demodulator section for demodulating a received signal into a demodulated signal. The decision-feedback equalizer comprises first filter means for filtering said demodulated signal into a first filtered signal in accordance with a plurality of main controllable tap gains, second filter means for filtering an input signal into a second filtered signal in accordance with a plurality of subsidiary controllable tap gains, producing means for producing an equalized signal dependent upon the first and the second filtered signals, and control means for controlling the main and the subsidiary controllable tap gains in accordance with the demodulated and the equalized signal.

According to this invention, the above-mentioned decision-feedback equalizer further comprises detecting means which detects whether or not the demodulator section is put in a synchronization state and produces a synchronization signal when the demodulator section is put in the synchronization state, and, otherwise, produces a nonsynchronization signal. In addition, the equalizer comprises supplying means responsive to the synchronization signal for supplying the second filter means with a first local signal as the input signal on the basis of the equalized signal. The supplying means responds to the nonsynchronization signal to supply the second filter means with a second local signal as the input signal on the basis of the demodulated signal.

DETAILED DESCRIPTION

Description of a Prior Art Decision-feedback Equalizer

Figure 1:
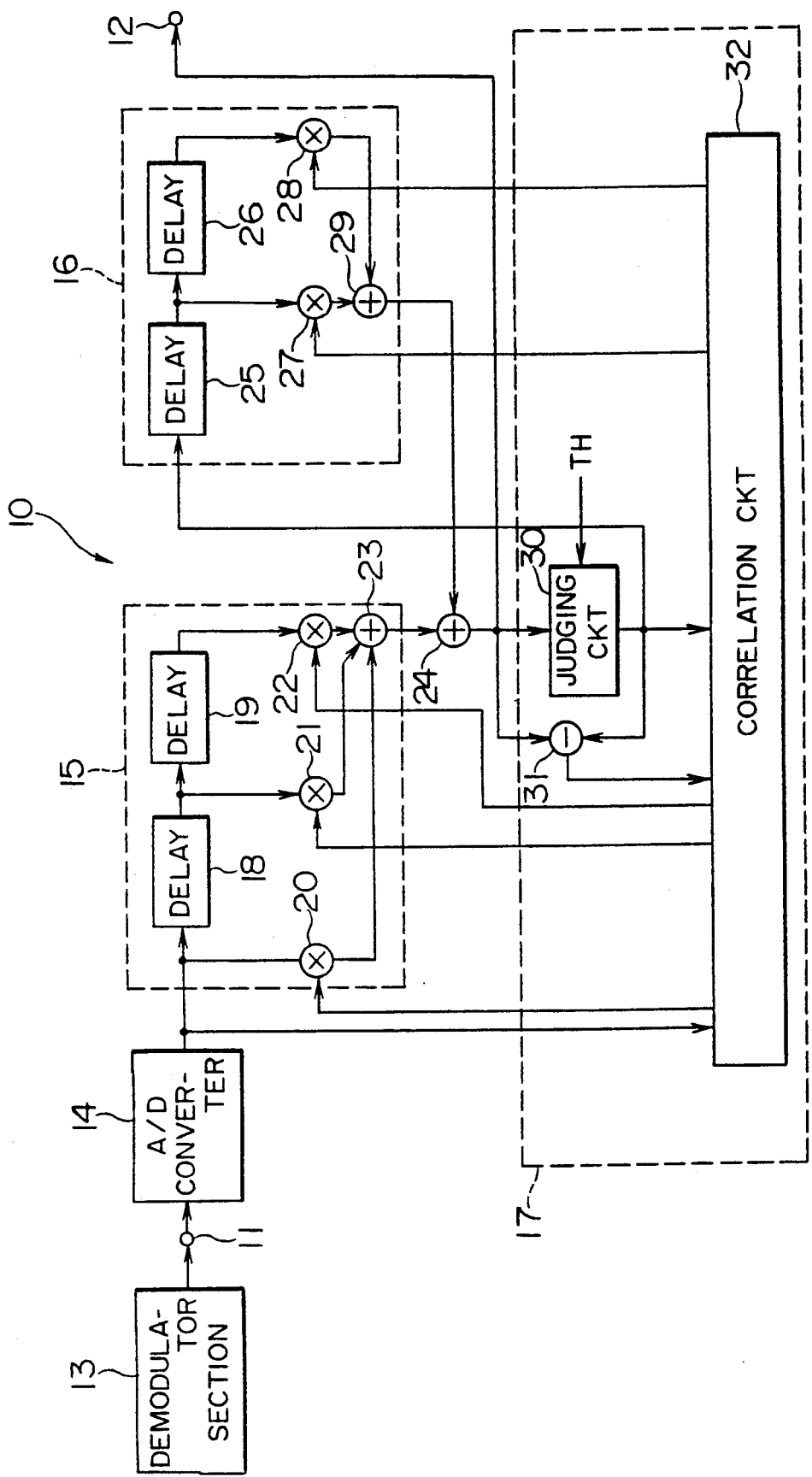
FIG. 1 is a block diagram of a conventional decision-feedback equalizer.

Referring to FIG. 1, description will first be made as regards a conventional decision-feedback equalizer for a better understanding of this invention. The illustrated decision-feedback equalizer 10 has equalizer input and output terminals 11 and 12. The input terminal 11 is connected to a demodulator section 13. Through a radio channel, a transmitted signal is supplied from a transmitter (not shown) to the demodulator section 13 as a received signal which is subjected to distortion during transmission. The transmitted signal may be, for example, a modulated signal into which a carrier signal is modulated by a digital signal in the transmitter. The digital signal is produced in the transmitter by sampling an analog signal at a sampling frequency f. The analog signal may be, for example, a speech signal.

At any rate, the demodulator section 13 demodulates the received signal into a demodulated signal to supply the demodulated signal to the input terminal 11 of the decision-feedback equalizer. The demodulated signal may be a baseband signal having a binary level or a multilevel. The demodulated signal is converted into a digital demodulated signal by an analog-digital (A/D) converter 14. The remaining parts of the illustrated decision-feedback equalizer serve to equalize the digital demodulated signal into an equalized signal for supplying the output terminal 12 with the equalized signal.

More particularly, the decision-feedback equalizer of the prior art comprises first and second transversal filters 15 and 16 each of which has a plurality of taps. The first transversal filter 15 serves to or lends itself to filter the digital demodulated signal into a first filtered signal in accordance with first through N-th main controllable tap gains, where N represents a positive integer which is not less than one and which is equal to the tap number of the first transversal filter 15. Similarly, the second transversal filter 16 acts to filter an input signal supplied thereto into a second filtered signal in accordance with first through M-th subsidiary controllable tap gains, where M represents a positive number which is not less than one and which is equal to the tap number of the second transversal filter 16. In the illustrated example, the positive integer N and the positive number M are equal to three and two, respectively.

The first through the third main controllable tap gains are supplied from a tap gain control circuit 17 (to be described later in detail) to the first transversal filter 15. The first and the second subsidiary controllable tap gains are also supplied from the tap gain control circuit 17 to the second transversal filter 16.

The first transversal filter 15 comprises first and second main delay circuits 18 and 19 and first through third main multipliers 20 to 22. Each of first and the second main delay circuits 18 and 19 gives a delay of a predetermined time (1/f) to a signal supplied thereto. As shown in FIG. 1, the digital demodulated signal is supplied to the first main delay circuit 18 and the first main multiplier 20. The first and the second main delay circuits 18 and 19 successively provide the above-mentioned delays to supply first and second main delayed signals to the second and the third main multipliers 21 and 22, respectively.

Supplied with the first main controllable tap gain in the manner which will be described hereinafter, the first main multiplier 20 multiplies the digital demodulated signal by the first main controllable tap gain to supply a first main multiplied signal to a first filter adder 23. The second and the third main multipliers 21 and 22 multiply first and the second delayed signals by the second and the third main controllable tap gains to produce second and third main multiplied or product signals, respectively, which are sent to the first filter adder 23. The first filter adder 23 calculates a first total sum of the first through the third main multiplied signals to supply the first total sum as the first filtered signal to an equalizer adder 24.

The second transversal filter 16 comprises first and second subsidiary delay circuits 25 and 26 and first and second subsidiary multipliers 27 and 28. Each of the first and the second subsidiary delay circuits 25 and 26 has a delay time (1/f) equal to the first and the second main delay circuits 18 and 19. The above-mentioned input signal is supplied to the first subsidiary delay circuit 25. The first and the second subsidiary delay circuits 25 and 26 supply first and second subsidiary delayed signals to the first and the second subsidiary multipliers 27 and 28, respectively.

Supplied with the first subsidiary controllable tap gain, the first subsidiary multiplier 27 multiplies the first subsidiary delayed signal by the first subsidiary controllable tap gain to supply a first subsidiary multiplied signal to a second filter adder 29. Likewise, the second subsidiary multiplier 28 multiplies the second subsidiary delayed signal by the second subsidiary controllable tap gain to supply a second subsidiary multiplied signal to the second filter adder 29. The second filter adder 29 calculates a second total sum of the first and the second subsidiary multiplied signals to supply the second total sum as the second filtered signal to the equalizer adder 24.

The equalizer adder 24 calculates an equalizer total sum of the first and the second filtered signals to deliver the equalizer total sum as the equalized signal to both the output terminal 12 and the tap gain control circuit 17.

Further referring to FIG. 1, the tap gain control circuit 17 comprises a judging circuit 30, a subtractor 31, and a correlation circuit 32. The judging circuit 30 and the subtractor 31 receive the equalized signal.

The judging circuit 30 is given a predetermined threshold level TH from a threshold circuit (not shown). The judging circuit 30 at first judges the equalized signal to determine whether or not a binary level of the equalized signal exceeds the predetermined threshold level to decide a judged binary level for the equalized signal. The judging circuit 30 thereby produces a judged signal specifying the judged binary level. The judging circuit 30 delivers the judged signal to the second transversal filter 16, the subtractor 31, and the correlation circuit 32. The second transversal filter 16 receives the judged signal as the above-mentioned input signal.

The subtractor 31 subtracts the equalized signal from the judged signal to supply an error signal to the correlation circuit 32. The correlation circuit 32 produces the first through the third main controllable tap gains and the first and the second subsidiary controllable tap gains in accordance with the digital demodulated signal, the judged signal, and the error signal, as will be described hereinafter.

In the interim, when the received signal is subjected to a large distortion through the radio channel and is given to the above-mentioned equalizer, the distortion inevitably and partially remains as a residual distortion in the equalized signal. This is because the decision-feedback equalizer becomes to a divergence state when the received signal is subjected to the large distortion. As a result, it is difficult to quickly control the first through the third main controllable tap gains and the first and the second subsidiary controllable tap gains by the tap gain control circuit 17.

DESCRIPTION OF A PREFERRED EMBODIMENT OF THE INVENTION

Figure 2:
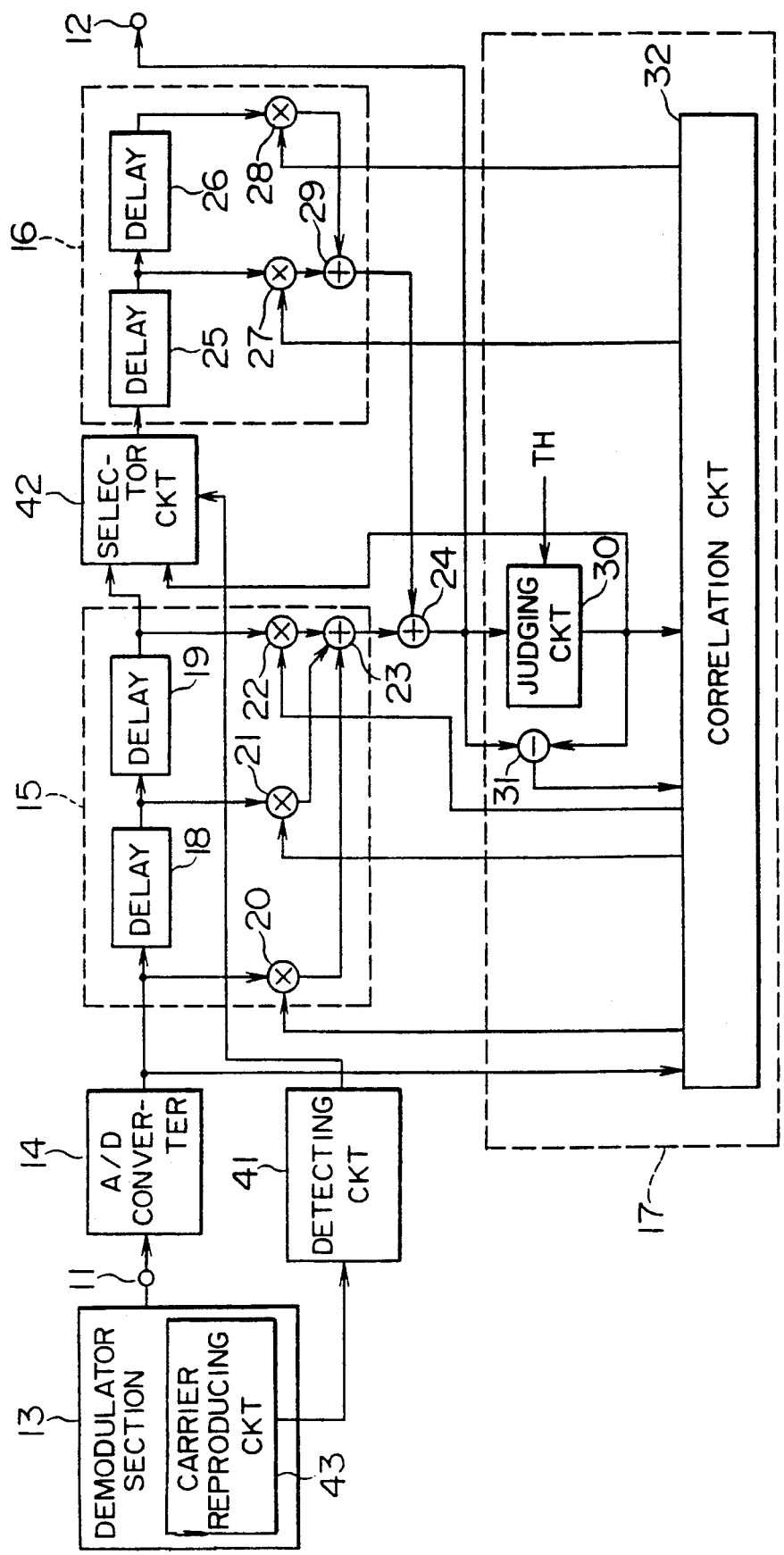
FIG. 2 is a block diagram of a decision-feedback equalizer according to an embodiment of this invention.

Referring to FIG. 2, description will proceed to a decision-feedback equalizer according to a preferred embodiment of this invention. The decision-feedback equalizer 40 comprises similar parts to the decision-feedback equalizer 10 (of FIG. 1), which are designated by like reference numerals and are operable with similar signals. However, the decision-feedback equalizer is somewhat different in structure from the decision-feedback equalizer 10 of the prior art, which is illustrated with reference to FIG. 1, and is, therefore, designated afresh by a reference numeral 40. Specifically, the decision-feedback equalizer 40 further comprises a detecting circuit 41 and a selector circuit 42. The detecting circuit 41 is connected to the demodulator section 13 and the selector circuit 42. The selector circuit 42 is located between the first and the second transversal filters 15 and 16 and is connected to the tap control circuit 17.

In FIG. 2, the demodulator section 13 comprises a carrier reproducing circuit 43 which is connected to the detecting circuit 41 to reproduce the carrier signal in synchronism with the received signal. When the carrier signal is reproduced from the received signal, the carrier reproducing circuit 43 supplies a first control signal to the detecting circuit 41. When the carrier signal is not synchronized with the received signal, the carrier reproducing circuit 43 supplies a second control signal to the detecting circuit 41. Such a detecting circuit 41 is disclosed in Japanese Unexamined Patent Publication No. 17661 (Tokkai Syo 48-17661) and will not be described any longer.

When supplied with the first control signal, the detecting circuit 41 knows that the demodulator section 13 is put in a carrier synchronization state. In this case, the detecting circuit 41 delivers a synchronization signal to the selector circuit 42. The selector circuit 42 responds to the synchronization signal and selects the second main delayed signal as a first local signal to supply the second transversal filter 16 with the first local signal as the input signal.

When supplied with the second control signal, the detecting circuit 41 knows that the demodulator section 13 is put out of the carrier synchronization state. The detecting circuit 41 delivers a nonsynchronization signal to the selector circuit 42. Responsive to the nonsynchronization signal, the selector circuit 42 selects a second local signal as the judged signal to supply the second transversal filter 16 with the second local signal as the input signal.

Figure 3:
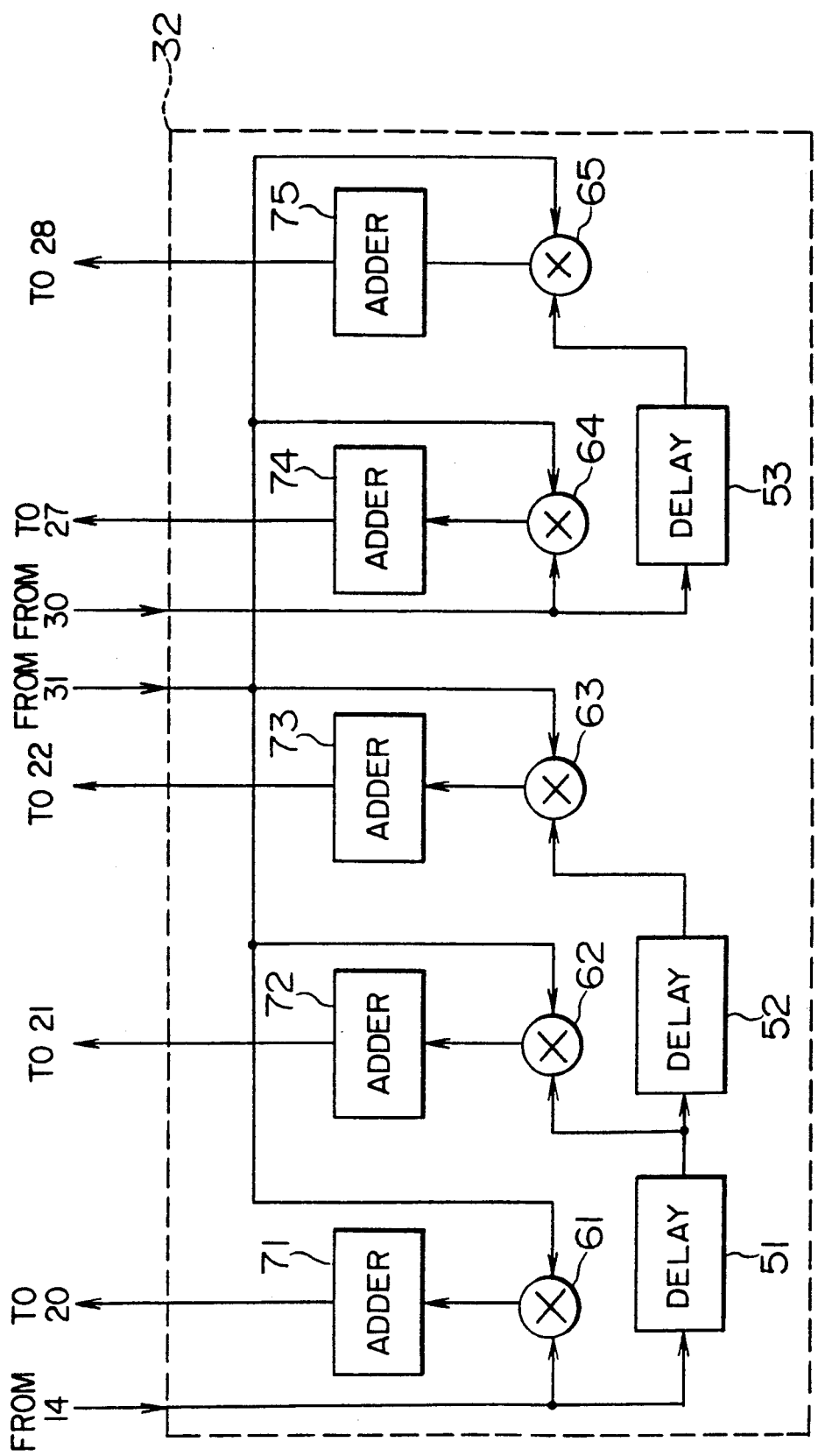
FIG. 3 is a block diagram of a correlation circuit used in the decision-feedback equalizer illustrated in FIG. 2.

Referring to FIG. 3 in addition to FIG. 2, the correlation circuit 32 receives the digital demodulated signal, the judged signal, and the error signal as described in connection with FIG. 1. The correlation circuit 32 comprises first through third local delay circuits 51 to 53, first through fifth local multipliers 61 to 65, and first through fifth local adders 71 to 75. Each of the first through the third local delay circuits 51 to 53 gives a delay of the predetermined time (1/f) to a signal supplied thereto. The digital demodulated signal is supplied from the A/D converter 14 (FIG. 2) to the first local multiplier 61 and the first local delay circuit 51. The judged signal is delivered from the subtractor 31 to the fourth local multiplier 64 and the third local delay circuit 53. The error signal is delivered from the subtractor 31 to the first through the fifth multipliers 61 to 65.

The first and the second local delay circuits 51 and 52 supply first and second local delayed signals to the second and the third local multipliers 62 and 63, respectively. The third local delay circuit 53 supplies third local delayed signal to the fifth local multiplier 65.

The first local multiplier 61 multiplies the digital demodulated signal by the error signal to produce a first local multiplied signal. The first local multiplied signal is supplied to the first local adder 71 to be successively summed up therein. Therefore, the first local adder 71 produces a first sum signal to supply the first sum signal as the first main controllable tap gain to the first main multiplier 20.

Likewise, the second and the third local multipliers 62 and 63 multiply the first and the second local delayed signals by the error signal to supply second and the third local multiplied signals to the second and the third local adders 72 and 73, respectively. The second and the third adders 72 and 73 successively sum up the second and the third local multiplied signals to produce second and third sum signals, respectively. The second and the third sum signals are supplied as the second and the third main controllable tap gains to the second and the third main multipliers 21 and 22, respectively.

In addition, the fourth local multiplier 64 multiplies the judged signal by the error signal to supply a fourth local multiplied signal to the fourth local adder 74. The fourth local adder 74 successively sum up the fourth local multiplied signal to deliver the fourth local sum signal as the first subsidiary controllable tap gain to the first subsidiary multiplier 27. Similarly, the fifth local multiplier 65 multiplies the third local delayed signal by the error signal to supply a fifth local multiplied signal to the fifth local adder 75. The fifth local adder 75 successively sum up the fifth local multiplied signal to supply the fifth local sum signal as the second subsidiary controllable tap gain to the second subsidiary multiplier 28.

While this invention has thus far been described in conjunction with a preferred embodiment thereof, it will readily be possible for those skilled in the art to put this invention into practice in various other manners. For example, the input terminal 13 may be directly connected to the first transversal filter 15 and the tap gain control circuit 17 without the A/D converter 14 when the demodulated signal is given as an intermediate-frequency (IF) signal. Furthermore, the judging circuit 30 judges the equalized signal in accordance with a plurality of threshold levels to produce the judged signal when the demodulated signal has a multi-level.

What is claimed is:

1. A decision-feedback equalizer connected to a demodulator section for demodulating a received signal into a demodulated signal, said decision-feedback equalizer comprising:

first filter means for filtering said demodulated signal into a first filtered signal in accordance with a plurality of main controllable tap gains, said first filter means producing a first local signal from said demodulated signal;

second filter means for filtering an input signal into a second filtered signal in accordance with a plurality of subsidiary controllable tap gains;

producing means for producing an equalized signal in response to said first and said second filtered signals;

control means for controlling said main controllable tap gains and said subsidiary controllable tap gains in accordance with said demodulated signal and said equalized signal;

detecting means for detecting whether or not said demodulator section is put in a synchronization state and producing a synchronization signal when said demodulator section is put in said synchronization state, said detecting means otherwise producing a nonsynchronization signal; and supplying means responsive to said synchronization signal for supplying said second filter means with said first local signal as said input signal, and said supplying means supplying said second filter means with a second local signal as said input signal on the basis of said equalized signal in response to said nonsynchronization signal.

2. A decision-feedback equalizer as claimed in claim 1, said main controllable tap gains being specified by first through N-th main controllable tap gains, where N represents a positive integer which is not smaller than one, wherein said first filter means comprises:

delaying means for delaying said demodulated signal to produce first through K-th delayed signals which have first through K-th delay times different from one another, where K represents a positive number equal to (N−1), said K-th delayed signal being produced as said first local signal;

multiplier means for multiplying said demodulated signal by the first main controllable tap gain to produce a first main multiplied signal;

additional multiplier means for multiplying said first through said K-th delayed signals by said second through said N-th main controllable tap gains to produce second through K-th multiplied signals, respectively;

adder means for calculating a total sum of said first through said N-th multiplied signals to produce a total sum signal representative of said total sum, said total sum signal being produced as said first filtered signal; and first path means for allowing said K-th delayed signal to pass as said first local signal therethrough.

3. A decision-feedback equalizer as claimed in claim 2, said equalized signal being a binary signal specified by a binary level, wherein said control means comprises:

judging means for judging whether or not the binary level of said equalized signal exceeds a predetermined threshold level to determine a judged binary level for said equalized signal and to produce a judged signal representative of said judged binary level;

second path means for allowing said judged signal to pass as said second local signal therethrough;

error producing means for producing an error signal indicative of a difference between said equalized signal and said judged signal;

first calculating means for calculating said first through said N-th main controllable tap gains in accordance with said demodulated signal and said error signal;

second calculating means for calculating said subsidiary controllable tap gains in accordance with said judged signal and said error signal; and means for supplying said first through said N-th main controllable tap gains and said subsidiary controllable tap gains to said first and said second filter means, respectively.

4. A decision-feedback equalizer as claimed in claim 2, said equalized signal being a multilevel signal having a plurality of levels greater than two, wherein said control means comprises:

judging means for judging which one of said levels said multilevel signal has as a judged level to produce a judged signal representative of said judged level;

second path means for allowing said judged signal to pass as said second local signal therethrough;

error producing means for producing an error signal indicative of a difference between said equalized signal and said judged signal;

first calculating means for calculating said first through said N-th main controllable tap gains in accordance with said demodulated signal and said error signal;

second calculating means for calculating said subsidiary controllable tap gains in accordance with said judged signal and said error signal; and means for supplying said first through said N-th main controllable tap gains and said subsidiary controllable tap gains to said first and said second filter means, respectively.

5. A decision-feedback equalizer as claimed in claim 1, said equalized signal being specified by a binary signal having a binary level, wherein said control means comprises:

judging means for judging whether or not the binary level of said equalized signal is greater than a predetermined threshold level to determine a judged binary level for said equalized signal and to produce a judged signal representative of said judged binary level;

path means for allowing said judged signal to pass as said second local signal therethrough;

error producing means for producing an error signal indicative of a difference between said equalized signal and said judged signal; and first calculating means for calculating said main controllable tap gains in accordance with said demodulated signal and said error signal;

second calculating means for calculating said subsidiary controllable tap gains in accordance with said judged signal and said error signal; and means for supplying said controllable tap gains and said subsidiary controllable tap gains to said first and said second filter means, respectively.

* * * * *